United States Patent [19]

Okazaki

[11] Patent Number: 4,994,209

[45] Date of Patent: Feb. 19, 1991

[54] NONLINEAR OPTICAL MATERIAL

[75] Inventor: Masaki Okazaki, Kanagawa, Japan

[73] Assignee: Fuji Photo Film Co., Ltd., Kanagawa, Japan

[21] Appl. No.: 235,405

[22] Filed: Aug. 22, 1988

[30] Foreign Application Priority Data

Aug. 21, 1987 [JP] Japan .................................. 62-207842

[51] Int. Cl.$^5$ ............................ F21V 9/04; G02B 6/10
[52] U.S. Cl. ...................................... 252/587; 252/582; 252/301.35; 350/96.12
[58] Field of Search ........... 252/582, 589, 600, 301.35, 252/587; 548/250, 251, 253, 252, 262, 263, 264, 265, 266, 268, 300, 323, 327, 329, 330, 331, 332, 333, 334, 335, 337, 338, 339, 400, 541, 542, 543, 544, 550, 565, 577, 578, 579; 350/96.12

[56] References Cited

U.S. PATENT DOCUMENTS 4,746,199  5/1988  Nicoud et al. ...................... 350/354

FOREIGN PATENT DOCUMENTS 3707835  9/1987  Fed. Rep. of Germany .

OTHER PUBLICATIONS

March, J., Advanced Organic Chemistry 3rd, Wiley, N.Y., 1985, pp. 242-244.
Tweig, R. J. Report 1985, UCRL-15706, Organic Materials for Second Harmonic Generation, 1986. Chemical Abstract 106:12961v, 1987.
Williams, D. J., Angew. Chem. Int. Ed. Engl. 23 (1984) 690-703.
Davydov, B. L. et al., Optics and Spectroscopy, vol. 30(3); 274, 1971.

Primary Examiner—John S. Maples
Assistant Examiner—Richard Treanor
Attorney, Agent, or Firm—Sughrue, Mion, Zinn, Macpeak & Seas

[57] ABSTRACT

An organic nonlinear optical material which is an optically transparent solid solution comprising (a) an organic compound component exhibiting nonlinear optical response represented by formula (I):

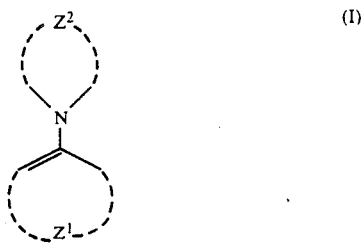

wherein $Z^1$ represents an atomic group, which together with the adjacent carbon atom, forms a substituted or unsubstituted 5- to 6-membered aromatic ring having at least one nitro group as a substituent; and $Z^2$ represents an atomic group, which together with the adjacent nitrogen atom, forms a substituted or unsubstituted pyrrole, imidazole, pyrazole, triazole or tetrazole ring, and (b) a polymer. The nonlinear optical material exhibits high nonlinear optical response and excellent transmission to blue light.

5 Claims, No Drawings

NONLINEAR OPTICAL MATERIAL

FIELD OF THE INVENTION

This invention relates to a nonlinear optical material suitable for use in various elements utilizing nonlinear optical effects, such as a wavelength converter element, etc.

BACKGROUND OF THE INVENTION

Much attention has recently been directed to materials having nonlinear optical effects, i.e., nonlinear properties between polarization and an electric field which is presented on reception of a strong photoelectric field such as a laser beam. Such materials are generally known as nonlinear optical materials and are described in detail, e.g., in David J. Williams (ed.), *Nonlinear Optical Properties of Organic and Polymeric Materials*, ACS Symposium Series 233, American Chemical Society (1983), and M. Kato & H. Nakanishi (eds.), *Organic Nonlinear Optical Materials*, CMC Co. (1985).

One of the applications of nonlinear optical materials is a wavelength modulation device utilizing second harmonic generation (SHG) ascribed to the secondary nonlinear effect and sum frequency wave and difference frequency wave. Nonlinear optical materials which have been used practically in this application include inorganic perovskite structures typically exemplified by lithium niobate. In recent years, $\pi$-electron conjugated organic compounds having an electron donative group and an electron attractive group have been proved to exhibit greatly improved performance properties as nonlinear optical materials over the aforesaid inorganic materials. However, in the field of organic chemistry, difficulty arises in obtaining large single crystals with satisfactory quality. Moreover, achievement of nonlinear optical effects of the even number order (for example, SHG and secondary nonlinear optical effects represented by primary electro-optic effects) requires that the alignment of crystal molecules involves no inversion symmetry. In an attempt to avoid involvement of inversion symmetry in the molecular alignment, it has been proposed and studies have been conducted to introduce a hydrogen-bonding group or a chiral center, but fully satisfactory results have not necessarily been attained.

Hence, there has been proposed a method of blending a compound exhibiting a nonlinear optical response with a polymer to form a solid solution and, in order to agree with manifestation of the nonlinear optical effects of the even number order, a method of using a solid solution in which molecules are aligned without involving inversion symmetry, for example, by applying an electric field. As used herein, the terminology "solid solution" refers to a composition containing a compound exhibiting a nonlinear optical response and a polymer in a homogeneous state. In these methods, organic compounds exhibiting a nonlinear response would be better suited as the nonlinear susceptibility in the molecular state becomes higher. It is known that compounds having a long $\pi$-electron conjugated chain are helpful for manifestation of such properties. As referred to in the above-cited references, these compounds naturally show absorption maxima shifted to the longer wavelength side to cause, for example, reduction of transmittance of blue light, which leads to a hindrance to generation of blue light as second harmonic wave. The same disadvantage also occurs in p-nitroaniline derivatives. It is obvious that the efficiency of SHG is greatly influenced by the transmittance at that wavelength, as illustrated in Alain Azema, et al., *Proceedings of SPIE*, Vol. 400, P186, FIG. 4, New Optical Materials (1983).

Therefore, it has been desired to develop a nonlinear optical material having a high transmittance to blue light. To this effect, substitution of a carbon atom of the benzene nucleus of nitroanilines by a nitrogen atom, etc. has been studied, but fully satisfactory results have not been necessarily obtained.

Under the above-mentioned circumstances, it has been desired to develop a compound which shows high nonlinear optical responses, excellent blue light transmittance, and suitability for forming a solid solution with a polymer.

SUMMARY OF THE INVENTION

One object of this invention is to provide a solid solution comprising a compound which exhibits high nonlinear optical response and excellent transmittance to blue light and a polymer.

Another object of this invention is to provide a solid solution in which a nonlinear optical responding compound is regularly orientated.

It has now been found that the objects of this invention can be accomplished by using a compound represented by formula (I) hereinafter shown, preferably a compound represented by formula (II) hereinafter shown.

The present invention is directed to a nonlinear optical material comprising an optically transparent solid solution comprising (a) an organic compound exhibiting nonlinear optical response represented by formula (I):

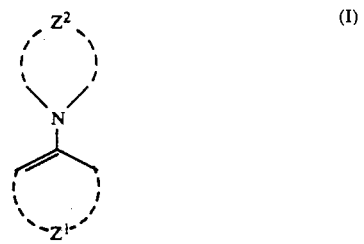

wherein $Z^1$ represents an atomic group, which together with the adjacent carbon atom, forms a substituted or unsubstituted 5- to 6-membered aromatic ring having at least one nitro group as a substituent; and $Z^2$ represents an atomic group, which together with the adjacent nitrogen atoms, forms a substituted or unsubstituted pyrrole, imidazole, pyrazole, triazole or tetrazole ring, and (b) a polymer.

DETAILED DESCRIPTION OF THE INVENTION

In Formula (I), examples of the 5- or 6-membered aromatic ring as represented by $Z^1$ together with the adjacent carbon atom, include thiazoles, oxazoles, imidazoles, pyridines, pyrimidines, benzenes, etc., each of which may be substituted or may be condensed. The substituents include an alkyl group (e.g., methyl, ethyl, isopropyl, butyl, t-butyl, octyl, t-octyl, decyl, hexadecyl, docosyl, 2-hydroxyethyl, carboxymethyl, cyanomethyl, 2-methoxyethyl, benzyl, 2-phenylethyl, trifluoromethyl, and 3-(2-benzimidazolyl)propyl); an aryl group (e.g., phenyl, 4-methylphenyl, 3-methoxyphenyl, and 4-chlorophenyl); a halogen atom (e.g., fluorine, chlorine, bromine, and iodine); an alkoxy group (e.g., methoxy, butoxy, 2-methoxyethoxy, benzyloxy, and 2-phenylethoxy); an aryloxy group (e.g., phenoxy, 4-t-butylphenoxy, and 4-chlorophenoxy); an acylamino group (e.g., acetylamino, 2-ethylhexanoylamino, pivaloylamino, methanesulfonylamino, benzoylamino, and 4-methylbenzenesulfonylamino); a carbamoyl group (e.g., carbamoyl, N-methylcarbamoyl, N-ethylcarbamoyl, and N-phenylcarbamoyl); a sulfamoyl group (sulfamoyl, N-methylsulfamoyl, and N-phenylsulfamoyl); an acyloxy group (e.g., acetyloxy, pivaloyloxy, benzyloxy, and benzenesulfonyloxy); an alkyloxycarbonyl group; an aryloxycarbonyl group; an alkyloxysulfonyl group; an aryloxysulfonyl group, an alkylthio group, an arylthio group; a hydroxyl group; a thiol group; a carboxyl group; a ureido group (e.g., methylureido, ethylureido, and phenylureido); a cyano group; an alkylsulfonyl group; an arylsulfonyl group; an alkylsulfinyl group, an arylsulfinyl group; a nitro group, and the like.

The pyrrole, imidazole, pyrazole, triazole or tetrazole ring formed by $Z^2$ together with the adjacent nitrogen atom may be substituted with, for example, an alkyl group (e.g., methyl, ethyl., t-butyl, 2-ethylhexyl, and trifluoromethyl); a halogen atom (e.g., fluorine, chlorine, bromine, and iodine); an acylamino group (e.g., acetylamino, pivaloylamino, 2-ethylhexanoylamino, 2,2-dimethylpentanoyl, and 2-(2,5-di-t-amylphenoxy)-propionyl); an alkoxy group (e.g., methoxy, 2-methoxyethoxy, phenoxy, and 2,5-di-t-amylphenoxy), and the like.

Among the compounds represented by formula (I), preferred are those represented by formula (II):

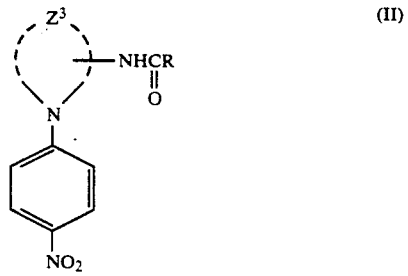

(II)

wherein $Z^3$ represents an atomic group, which together with the adjacent nitrogen atom, forms a substituted or unsubstituted pyrrole, imidazole, pyrazole, triazole or tetrazole ring; and R represents a branched chain alkyl group having at least 3 carbon atoms or an alkyl group substituted with a substituted or unsubstituted phenyloxy group.

The substituents for the pyrrole, imidazole, pyrazole, triazole or tetrazole ring formed by $Z^3$ include an alkyl group (e.g., methyl and ethyl); a halogen atom (e.g., fluorine, chlorine, and bromine); an alkoxy group (e.g., methoxy and ethoxy), and an acylamino group having a formula

wherein R' has the same meaning as R above. Of these substituents, preferred are a methyl group and an acylamino group of the above formula.

Examples of the alkyl group represented by R include isopropyl, sec-butyl, t-butyl, isoamyl, t-amyl, 1-ethylpentyl, phenoxymethyl, 1-phenoxyethyl, 1-phenoxypropyl, 3-phenoxypropyl, 2,5-di-t-amylphenoxymethyl, 1-(2,5-di-t-amylphenoxy)ethyl, 1-(2,5-di-t-amylphenoxy)propyl, 3-(2,5-di-t-amylphenoxy)propyl, 4-(2,5-di-t-amylphenoxy)butyl, 1-(2-chloro-5-t-amylphenoxy)hexyl, 1-(2,4-di-t-amylphenoxy)amyl, 1-(2,4-di-t-amylphenoxy)butyl, 1-(3-acetylaminophenoxy)amyl, 1-(2,4-di-t-octylphenoxy)heptyl, 1-(2-chloro-4-t-octylphenoxy)amyl, 1,1-dimethyl-1-(3-pentadecylphenoxy)methyl, 1-(4-t-octylphenoxy)propyl, etc.

From the standpoint of small molecular weight and high solubility in polymers, preferred of the compounds represented by formula (II) are those wherein R represents a branched chain alkyl group, and more preferred are those wherein the branched chain alkyl contains not more than 8 carbon atoms.

Specific but non-limitative examples of the compounds which can be used in the present invention are shown below.

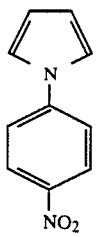

1.

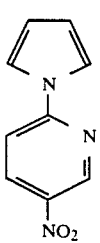

2.

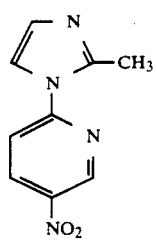
3.
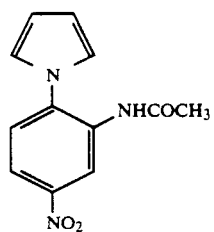
4.
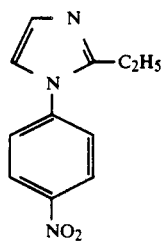
5.
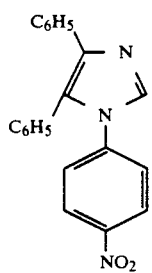
6.
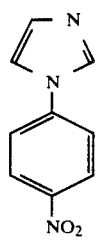
7.
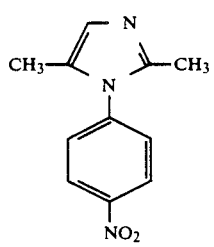
8.

-continued
9.
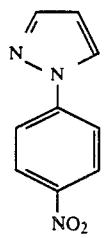
10.
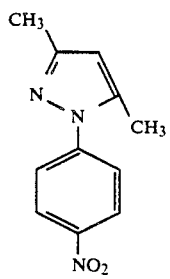
11.
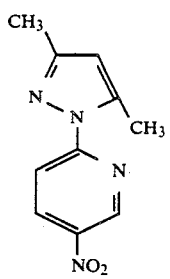
12.
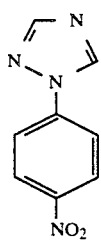
13.
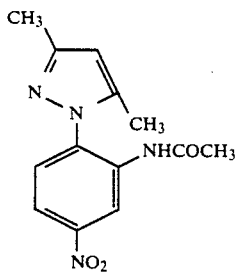
14.
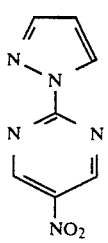

-continued
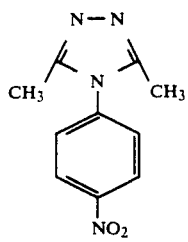 15.
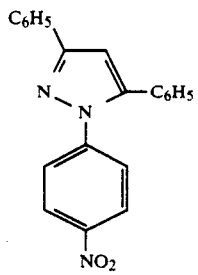 16.
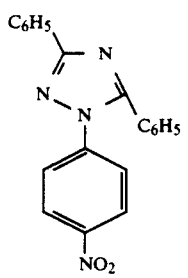 17.
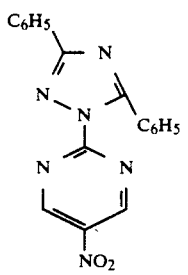 18.
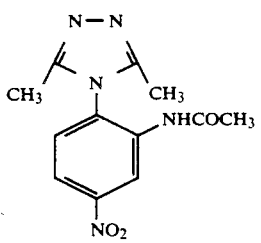 19.
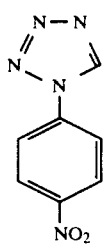 20.

-continued
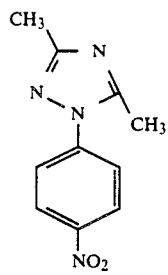 21.
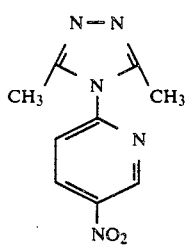 22.
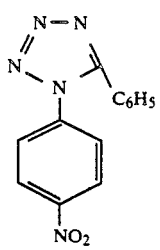 23.
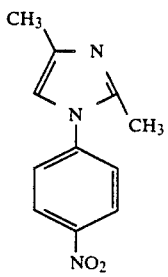 24.
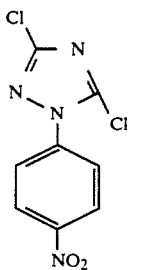 25.
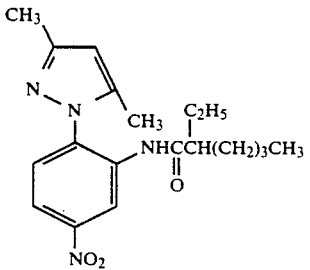 26.

27.
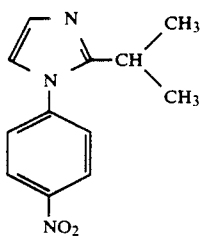
28.
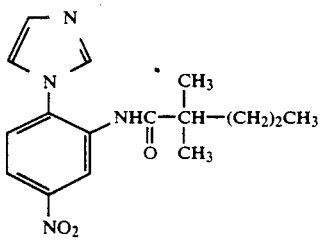
29.
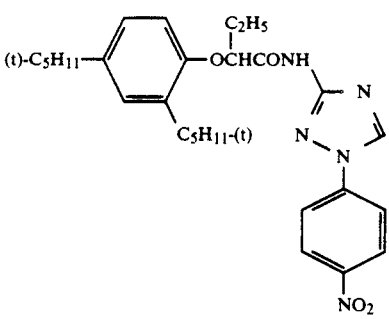
30.
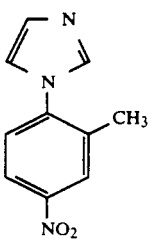
31.
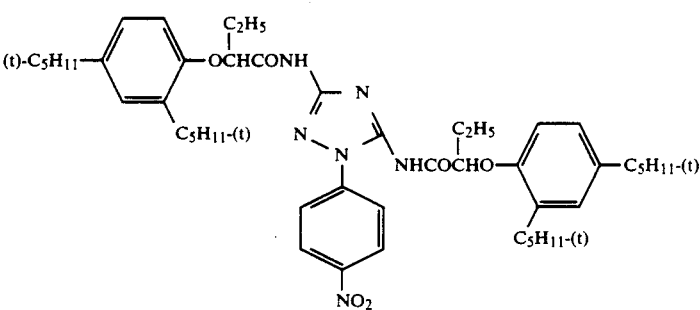
32.
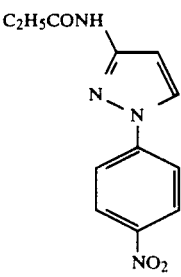

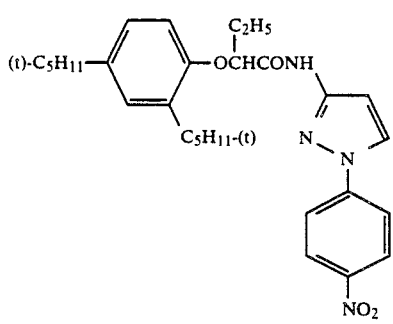
33.
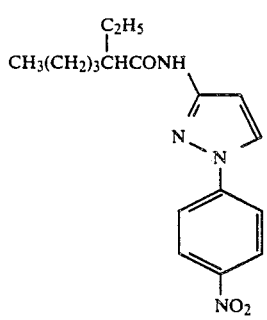
34.
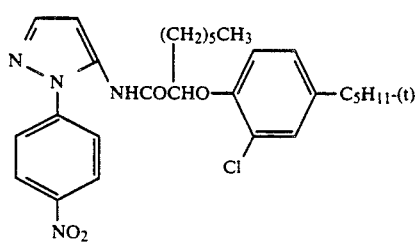
35.
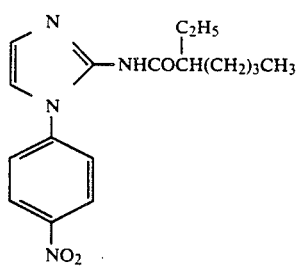
36.
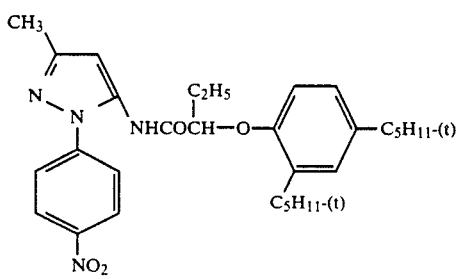
37.

38.
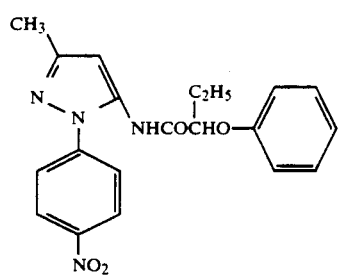
39.
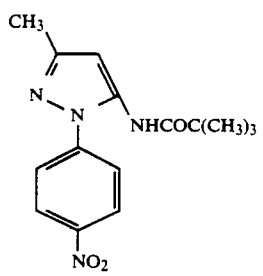
40.
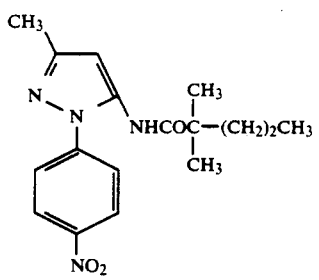
41.
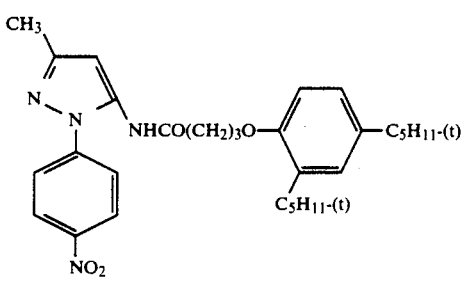
42.
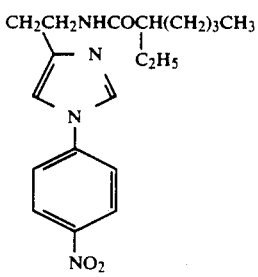
43.
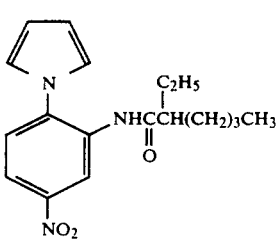
The compounds of formula (I) can be synthesized easily in accordance with the methods disclosed in JP-A-62-210432 (corresponding to U.S. Ser. No. 024,496)

and Japanese patent application No. 62-197739 filed Aug. 7, 1987 for an invention entitled "novel nitrobenzene derivatives". (The term "JP-A" as used herein means an "unexamined published Japanese patent application".)

The compounds of formula (I) can be easily synthesized according to the following reaction scheme:

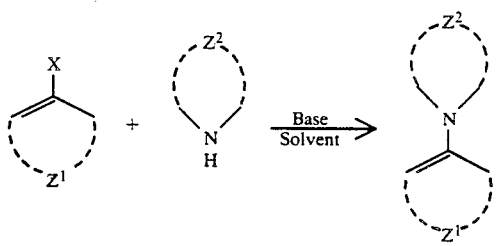

wherein $Z^1$ and $Z^2$ are as defined above; and X represents a halogen atom.

The base which can be used in the above reaction includes organic bases, e.g., pyridine, triethylamine, 1,8-diazabicyclo[5,4,0]-7-undecene, etc., and inorganic bases, e.g., potassium carbonate, sodium hydrogencarbonate, potassium t-butoxide, sodium hydride, sodium hydroxide, etc. The solvent to be used includes hydrocarbons, e.g., n-hexane, etc.; ethers, e.g., tetrahydrofuran, 1,2-dimethoxyethane, etc., amides, e.g., N,N-dimethylformamide, N-methylpyrrolidone, etc.; sulfur-containing compounds, e.g., dimethyl sulfoxide, sulforan, etc.; nitriles, e.g., acetonitrile, etc.; esters, e.g., ethyl acetate, etc.; and the like. Of these, amides, sulfur-containing compounds, and nitriles are preferred.

The reaction temperature preferably ranges from −10° C. to 150° C., and more preferably from 20° C. to 100° C.

Synthesis examples for the typical compounds of formula (I) are shown below.

SYNTHESIS EXAMPLE 1

Synthesis of Compound No. 1

5 ml of N,N-dimethylformamide was added to a mixture consisting of 1.41 g (10 mmol) of 4-fluoronitrobenzene, 0.67 g (10 mmol) of pyrrole, and 1.38 g (10 mmol) of potassium carbonate, and the resulting mixture was heated at 90° C. for 4 hours while stirring. The reaction mixture was poured into water, and the thus precipitated crystals were collected by filtration and washed with water. The crude crystals were recrystallized twice from isopropanol to obtain 1.21 g (64.4%) of Compound No. 1 having a melting point of 188° to 189° C.

$C_2H_5OH$ $\lambda=326$ nm max
Elementary Analysis:
Found (%): C 64.05, H 4.17, N 14.89,
Calcd (%): C 63.82, H 4.28, N 14.89.

SYNTHESIS EXAMPLE 2

Synthesis of Compound No. 5

The same procedure as described in Synthesis Example 1 was repeated, except that the pyrrole as used in Synthesis Example 1 was replaced by 2-ethylimidazole to obtain 1.63 g (75.1%) of Compound No. 5 having a melting point of 161° to 162° C.

$C_2H_5OH$ $\lambda=269$ nm max
Elementary Analysis:
Found (%): C 60.94, H 4.96, N 19.40,
Calcd (%): C 60.82, H 5.10, N 19.34.

SYNTHESIS EXAMPLE 3

Synthesis of Compound No. 11

The same procedure as described in Synthesis Example 1 was repeated, except for replacing the pyrrole by 3,5-dimethylpyrazole to obtain 1.51 g (69.6%) of Compound No. 11 having a melting point of 102° C.

$C_2H_5OH$ $\lambda=312$ nm, max
Elementary Analysis:
Found (%): C 60.76, H 4.91, N 19.26,
Calcd (%): C 60.82, H 5.10, N 19.34.

SYNTHESES EXAMPLE 4

Synthesis of Compound No. 21

The same procedure as described in Synthesis Example 1 was repeated, except for replacing the pyrrole by 1H-3,5-dimethyl-1,2,4-triazole to obtain 1.65 g (75.6%) of Compound No. 21 having a melting point of 156° to 156.5° C.

$C_2H_5OH$ $\lambda=285$ nm, max
Elementary Analysis:
Found (%): C 55.27, H 4.65, N 25.58,
Calcd (%): C 55.04, H 4.62, N 25.68.

Of the compounds represented by the formula (I), the compounds of formula (II) can be easily synthesized according to one of the following alternative routes:

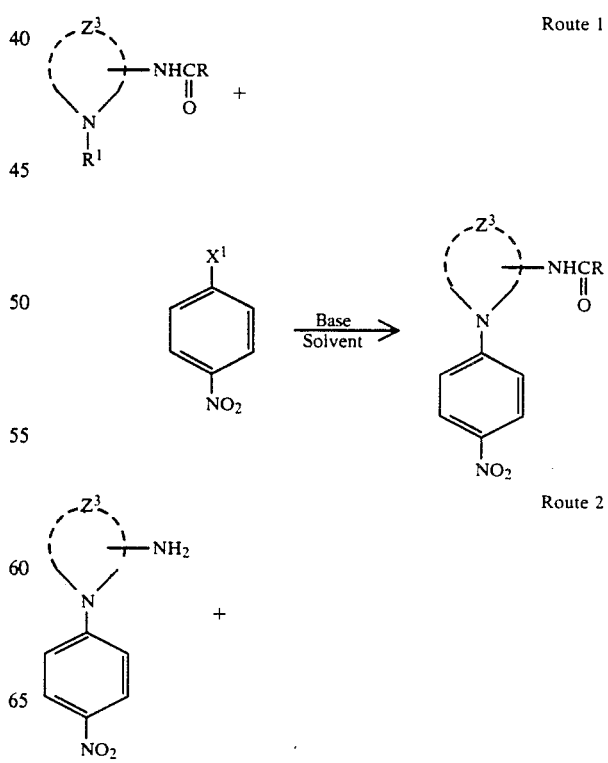

-continued

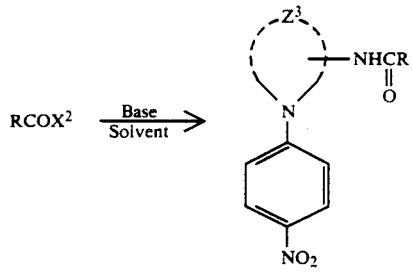

wherein $Z^3$ and R are as defined above, and $R^1$ represents a hydrogen atom or

$X^1$ represents a halogen atom, and $X^2$ represents a hydrogen atom or RCOO—.

The base, the solvent and the reaction temperature which can be used in Routes 1 and 2 are the same as those described above for the synthesis of compounds of formula (I).

Synthesis examples for the typical compounds of formula (II) are shown below.

SYNTHESIS EXAMPLE 5

Synthesis of Compound No. 31

10 ml of N,N-dimethylformamide was added to 6.3 g of 3,5-bis-[2-(2,4-di-t-amylphenoxy)-butyroylamino]1,2,4-triazole, 1.3 g of 4-fluoronitrobenzene and 1.3 g of potassium carbonate, and the resulting mixture was stirred for 3 hours on an oil base heated at 100° C. After allowing the reaction mixture to cool to room temperature, 50 ml of water was added thereto, and the solid formed was separated by filtration and washed with water. The solid was separated by silica gel column chromatography (eluted with ethyl acetate/n-hexane=1/9 by volume) to obtain the desired product. The product was recrystallized from a mixed solvent of ethyl acetate/n - hexane (1/1 by volume).

Yield: 5.3 g (71.6%),

Melting point: 140°–142.5° C.

SYNTHESIS EXAMPLE 6

Synthesis of Compound No. 32

10 ml of acetonitrile was added to 2.04 g of 3-amino-1-(4-nitrophenyl)pyrazole and 0.92 g of propionyl chloride, and then 2 ml of triethylamine was added dropwise to the mixture while stirring at room temperature. Thereafter, the resulting mixture was stirred for 2 hours on a water bath heated at 60° C. and then allowed to cool to room temperature. 50 ml of water was added to the mixture, and the precipitated crystals were filtered, and washed with water. The crude crystals thus obtained were recrystallized from isopropanol using activated carbon.

Yield: 2.1 g (80.8%),

Melting point: 202°–203° C.

SYNTHESIS EXAMPLE 7

Synthesis of Compound No. 33

The same procedure as described in Synthesis Example 6 was repeated, except that 3.39 g of 2-(2,4-di-t-amylphenoxy)butyroyl chloride was used instead of 0.92 g of propionyl chloride used in Synthesis Example 6, and N,N-dimethylacetamide was used instead of acetonitrile used in Synthesis Example 6. The resulting product was purified by column chromtography using silica gel and alumina (eluted with chloroform) to obtain the desired product.

Yield: 4.15 g (82.0%),

Melting point: 127.5°–129.5° C.

SYNTHESIS EXAMPLE 8

Synthesis of Compound No. 34

The same procedure as described in Synthesis Example 7 was repeated, except that 1.8 g of 2-ethylhexanoyl chloride was used instead of 3.39 g of 2-(2,4-di-t-amylphenoxy)butyroyl chloride used in Synthesis Example 7 to obtain the desired product.

Yield: 2.62 g (79.4%),

Melting point: 98°–99° C.

SYNTHESIS EXAMPLE 9

Synthesis of Compound No. 35

The same procedure as described in Synthesis Example 6 was repeated, except that the 3-amino-1-(4-nitrophenyl)pyrazole as used in Synthesis Example 6 was replaced by 5-amino-1-(4-nitrophenyl)pyrazole, 0.92 g of the propionyl chloride used therein was replaced by 4.30 g of 2-(2-chloro-4-t-amylphenoxy)octanoyl chloride, and the acetonitrile used therein was replaced by N,N-dimethylacetamide. The resulting product was purified in the same manner as in Synthesis Example 7 to obtain the desired product.

Yield: 4.15 g (78.8%),

Melting point: 108°–108.5° C.

The superiority of the compounds of formula (I) in transmittance of blue light is described in Example 2 of the above-cited JP-A-62-210432. Further, the high non-linear susceptibility exhibited by the compounds of formula (I) in the molecular state is described in the specification of the above-cited Japanese patent application filed on Aug. 7, 1987.

The polymer component which can be used in combination with the organic compound of formula (I) is a polymer having a number average molecular weight of from about 1,000 to about 100,000, preferably from 5,000 to 100,000. It is desirable that the polymer has an excellent light-transmittance of the visible light having a wavelength longer than 350 nm and does not has a double refraction property. Examples of such polymers include polymethacrylate, polyacrylate, polyacrylamide, epoxy polymers, polystyrene, polycarbonate, and so on.

The solid solution according to the present invention can be formed, for example, by a method comprising dissolving the compound of formula (I) and the polymer in an appropriate solvent and removing the solvent from the solution. The solvent to be used includes chloroform, dimethyl sulfoxide, methylene chloride, chlorobenzene, acetone, ethyl cellosolve, methyl cellosolve, ethyl cellosolve acetate, methyl cellosolve acetate, etc.

The content of the organic compound exhibiting nonlinear optical response in the solid solution generally ranges from 0.05 to 0.3 mol, preferably from 0.15 to 0.3 mol, more preferably from 0.2 to 0.25 mol, per 100 g of the solid solution.

The term "optically transparent" as used herein means a state free from turbidity due to light scatter.

Alignment of the compound of formula (I) in a given direction can be carried out, for example, by utilizing an electric field. For details of this technique, JP-A-62-96930 (the term "JP-A" as used herein means an "unexamined published Japanese patent application") and K. D. Singer et al., Appl. Phys. Lett., Vol. 49, No. 5, 248 (1986) can be referred to.

As is apparent from Examples hereinafter described, the nonlinear optical material of the present invention in the form of a solid solution is particularly useful as a material for wavelength converter elements. However, the utility of the nonlinear optical materials of the present invention is not limited to such wavelength converter elements, and the materials are applicable to other various elements utilizing the nonlinear optical effects Examples of such elements include optical bistable elements (e.g., an optical memory element, an optical pulse wave controlling element, and optical limiter, a differential amplifier, a phototransistor, an A/D converter element, an optical logic element, an optical multivibrator, an optical flip-flop circuit, etc.), as well as an optical modulator, a phase conjugating optical element, and the like.

The present invention is now illustrated in greater detail with reference to the following examples, but it should be understood that these examples are not deemed to limit the present invention.

EXAMPLES 1 TO 10

0.05 mmol of each of the compounds of the present invention shown in Table 1 below and 50 mg of polymethyl methacrylate having a number average molecular weight of 48,000 were weighed out and dissolved in 2 ml of acetone under light heating. The solution was spin coated on a glass base and dried to form an about 3 $\mu m$ thick film.

In each case, the resulting film was optically transparent, suffering from no visually perceivable white turbidity.

TABLE 1

| Example No. | Compound No. | Added Amount (mg) |
|---|---|---|
| 1 | 1 | 9.4 |
| 2* | 10 | 10.9 |
| 3* | 21 | 10.9 |
| 4* | 27 | 11.6 |
| 5 | 28 | 15.8 |
| 6 | 29 | 25.4 |
| 7 | 34 | 16.5 |
| 8 | 36 | 16.5 |
| 9 | 39 | 15.1 |
| 10 | 40 | 16.5 |

Note: *The film was prepared by casting the solution on the glass base and, after evaporation of acetone, heated on a hot plate at 150° C.

EXAMPLES 11 to 15

0.4 mmol of each of the compounds of the invention shown in Table 2 below and 50 mg of polymethyl methacrylate were weighed out and dissolved in 4 ml of acetone under light heating. The coating composition was spin-coated on a glass base coated with an indium tin oxide (ITO) to a film thickness of from 4 to 5 $\mu m$ in accordance with the method described in K. D. Singer et al., Apply. Phys. Lett., Vol. 49, No. 5, p 248 (1986). After drying, a semi-transparent layer of gold was formed on the film by vacuum evaporation. Then, the film was placed in a direct electric field of 0.6 MV/cm while being heated at 100° to 110° C. for 5 minutes, followed by cooling to room temperature with the same electric field being applied.

Thereafter, the electric field application was stopped, the film was irradiated with an Nd:YAG laser beam, and the intensity of secondary harmonics at 532 nm was determined by the use of a photomultiplier. The results obtained, relatively expressed by taking the SHG strength of nitrobenzene (Comparative Example) as a standard (1), are shown in Table 2.

TABLE 2

| Example No. | Compound No. | Relative SHG Strength |
|---|---|---|
| 11 | 26 | 25 |
| 12 | 28 | 55 |
| 13 | 34 | 30 |
| 14 | 36 | 51 |
| 15 | 40 | 27 |
| Comparison | nitrobenzene | 1 |

TABLE 2

All of the above samples were optically transparent before gold deposition.

REFERENCE EXAMPLE

Determination of dc-SHG

It has been known that the secondary nonlinear susceptibility in the molecular state can be determined by the dc-SHG method. According to the method as described by Umezaki et al., Lecture Abstracts of the 4th Symposium on Optics and Electronics Organic Materials, page 50, a relative efficiency of SHG was determined with respect to the compounds of this invention as a solution in acetone (at a concentration of 1 mol/liter). For comparison, the efficiency of SHG of nitrobenzene was determined (without a solvent) and was used as a standard (1). The results obtained are shown in Table 3 below.

TABLE 3

| Compound | Efficiency of SHG (Relative Ratio) | Remarks |
|---|---|---|
| 29 | 3 | Invention |
| 33 | 5 | " |
| 34 | 6 | " |
| 39 | 5.5 | " |
| 36 | 7.5 | " |
| Nitrobenzene | 1 | Comparison |

While the invention has been described in detail and with reference to specific embodiments thereof, it will be apparent to one skilled in the art that various changes and modifications can be made therein without departing from the spirit and scope thereof.

What is claimed is:

1. An organic nonlinear optical material which is an optically transparent solid solution comprising (a) an organic compound component exhibiting nonlinear optical response represented by formula (II):

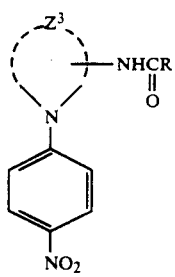 (II)

wherein $Z^3$ represents an atomic group, which together with the adjacent nitrogen atom, forms a pyrrole, imidazole, pyrazole, triazole or tetrazole ring which ring may be substituted by one or more substituents selected from the group consisting of an alkyl group, a halogen atom, an alkoxy group and an acylamino group having the formula

wherein R and R' each represent a branched chain alkyl group having at least 3 carbon atoms or an alkyl group substituted with a substituted or unsubstituted phenyloxy group, and (b) a polymer component selected from the group consisting of polymethacrylate, polyacrylate, polyacrylamide, epoxy polymers, polystyrene and polycarbonate.

2. An organic nonlinear optical material according to claim 1, wherein R represents a branched chain alkyl group having from 3 to 8 carbon atoms.

3. An organic nonlinear optical material according to claim 1, wherein said organic compound exhibiting nonlinear optical response is present in an amount of from 0.05 to 0.3 mol per 100 g of the solid solution.

4. An organic nonlinear optical material according to claim 1, wherein said polymer has a number average molecular weight of from about 1,000 to about 100,000.

5. An organic nonlinear optical material according to claim 1, wherein said polymer is optically transparent to visible light having a wavelength longer than 350 nm and does not exhibit double refraction.

* * * * *